(12) United States Patent
Kundu

(10) Patent No.: US 11,113,545 B2
(45) Date of Patent: Sep. 7, 2021

(54) ROAD DETECTION USING TRAFFIC SIGN INFORMATION

(71) Applicant: HITACHI AUTOMOTIVE SYSTEMS, LTD., Ibaraki (JP)

(72) Inventor: Subrata Kumar Kundu, Farmington Hills, MI (US)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 42 days.

(21) Appl. No.: 16/345,321

(22) PCT Filed: Dec. 16, 2016

(86) PCT No.: PCT/US2016/067108
§ 371 (c)(1),
(2) Date: Apr. 26, 2019

(87) PCT Pub. No.: WO2018/111297
PCT Pub. Date: Jun. 21, 2018

(65) Prior Publication Data
US 2019/0272435 A1    Sep. 5, 2019

(51) Int. Cl.
*G06K 9/00* (2006.01)
*G05D 1/02* (2020.01)

(52) U.S. Cl.
CPC ..... *G06K 9/00798* (2013.01); *G06K 9/00818* (2013.01); *G05D 1/0231* (2013.01)

(58) Field of Classification Search
None
See application file for complete search history.

(56) References Cited

U.S. PATENT DOCUMENTS

| 9,395,192 B1 | 7/2016 | Silver et al. |
| 2010/0259617 A1 | 10/2010 | Kawasaki et al. |

(Continued)

FOREIGN PATENT DOCUMENTS

| JP | 2-296172 A | 12/1990 |
| JP | 2010-210948 A | 9/2010 |

(Continued)

OTHER PUBLICATIONS

Iowa Department of Transportation, Traffic and Safety Manual, Chapter 2A-8, Sign Placement, pp. 1-17, (revised May 8, 2013). (Year: 2013).*

(Continued)

*Primary Examiner* — Vu Le
*Assistant Examiner* — Tracy Mangialaschi
(74) *Attorney, Agent, or Firm* — Mattingly & Malur, PC

(57) ABSTRACT

In some examples, one or more processors of a vehicle may store, in a computer-readable medium, sign information relating a sign type of a traffic sign to a distance to a road edge for a plurality of sign types. The one or more processors may receive at least one image from at least one sensor, and may recognize a sign type of a traffic sign in the at least one image. Further, the one or more processors may determine a likely location of a road edge in relation to the vehicle based at least partially on the recognized sign type and the stored sign information. In some examples, the one or more processors may send one or more control signals to at least one component of the vehicle based on the determined likely location of the road edge relative to the vehicle.

20 Claims, 11 Drawing Sheets

(56) References Cited

U.S. PATENT DOCUMENTS

| | | | |
|---|---|---|---|
| 2013/0261838 A1* | 10/2013 | Schut | G06K 9/00798 |
| | | | 701/1 |
| 2014/0211014 A1 | 7/2014 | Kawasaki et al. | |
| 2015/0210275 A1 | 7/2015 | Huberman | |
| 2015/0345974 A1* | 12/2015 | Takahashi | B60W 50/14 |
| | | | 701/461 |
| 2016/0162747 A1* | 6/2016 | Singh | G06K 9/00362 |
| | | | 348/148 |
| 2016/0318490 A1* | 11/2016 | Ben Shalom | B60T 7/18 |
| 2017/0008562 A1* | 1/2017 | Shashua | B60W 30/14 |

FOREIGN PATENT DOCUMENTS

| | | |
|---|---|---|
| JP | 2010-244456 A | 10/2010 |
| WO | 2014/115563 A1 | 7/2014 |

OTHER PUBLICATIONS

Ai, Chengbo, and Yi-Chang James Tsai. "Critical Assessment of an Enhanced Traffic Sign Detection Method Using Mobile LiDAR and INS Technologies." Journal of Transportation Engineering 141.5 (2015). (Year: 2015).*

International Search Report of PCT/US2016/067108 dated Apr. 28, 2017.

Japanese Office Action received in corresponding Japanese Application No. 2019-545875 dated May 19, 2020.

Extended European Search Report received in corresponding European Application No. 16924061.1 dated Jul. 16, 2020.

* cited by examiner

| | 806 Road Type | 808 Distance from Right Road Edge to Centerline | 810 Width of Road | 812 Width of Travel Lane | 814 Width of Shoulder |
|---|---|---|---|---|---|
| 802 First Jurisdiction | | | | | |
| | Rural 2-Lane Road without Shoulder | 10 ft Min. | 22 ft Min. | 10 ft Min. | N/A |
| | ... | ... | ... | ... | ... |
| 804 Second Jurisdiction | | | | | |
| | Rural 2-Lane Road without Shoulder | 9-10.5 ft | 18-20 ft | 9-12 ft | N/A |
| | ... | ... | ... | ... | ... |

FIG. 8

ROAD DETECTION USING TRAFFIC SIGN INFORMATION

TECHNICAL FIELD

This disclosure relates to the technical field of road detection for autonomous and semi-autonomous vehicles.

BACKGROUND

Advanced driver assistance systems (ADAS) and self-driving or otherwise autonomous and semi-autonomous vehicle systems are systems that automate or otherwise enhance vehicle systems for improved safety, automated driving, and the like. These systems typically include a function for recognizing the edge of a road (road edge) and the surface of the road (road plane), which may be used to help ensure that the vehicle stays on the road and in the proper lane. Sensor-based techniques are commonly used for detecting the road edge and road plane, such as by using one or more of cameras, LIDAR, radar, ultrasound, and so forth. For instance, images taken by a camera mounted on a vehicle may be used to estimate the road edge, such as by using various image processing algorithms. Further, the road plane may be estimated at least partially based on the road edge information. However, in some driving conditions, it may be difficult to detect the road edge, such as in case of snow, drifting sand, large quantities of leaves, flooding, or other such circumstances. The inability to detect the road edge and/or the road plane may lead to unsatisfactory performance or failure of the autonomous or semi-autonomous systems.

SUMMARY

Some implementations include arrangements and techniques for determining a likely location of a road edge. For instance, one or more processors of a vehicle may store, in a computer-readable medium, sign information relating sign types of traffic signs to distances to road edges for a plurality of sign types. The one or more processors may receive at least one image from at least one sensor, and may recognize a sign type of a traffic sign in the at least one image. Further, the one or more processors may determine a likely location of a road edge in relation to the vehicle based at least partially on the recognized sign type and the stored sign information. In some examples, the one or more processors may send one or more control signals to at least one component of the vehicle based on the determined likely location of the road edge relative to the vehicle.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 8 illustrates an example road information data structure for storing road information according to some implementations.

DESCRIPTION OF THE EMBODIMENTS

Figure 1:
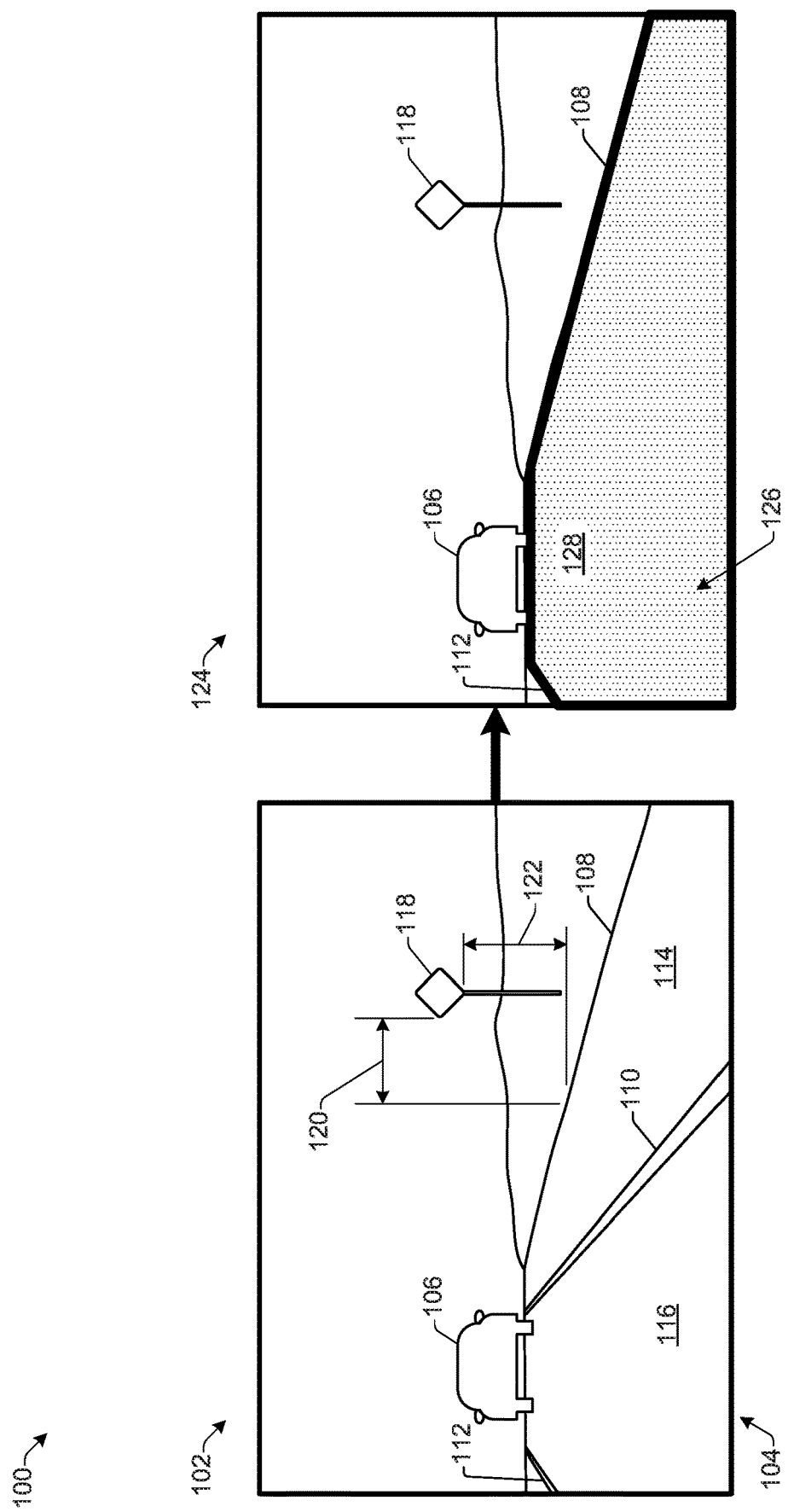
FIG. 1 illustrates an example of detecting road information according to some implementations.

Some implementations herein are directed to techniques and arrangements able to detect road edge and road plane by detecting and recognizing roadside traffic signs, and determining the location of the recognized traffic signs relative to the vehicle. The automatic detection of road edges and road planes, as described herein, may provide significant advantages for enabling ADAS and/or autonomous and semi-autonomous vehicle systems. As one example, as a vehicle travels on a road, a road edge detecting system may execute recognition logic, such as a recognition module, for recognizing a type of traffic sign in a field of view of a camera or other sensor mounted on the vehicle. The road edge detecting system may access a storage that stores traffic sign information in a database or other data structure. The stored traffic sign information may indicate a specified position of the recognized type of traffic sign relative to the road edge. The road edge detecting system may estimate a location of the road edge based on a determined location of the traffic sign relative to the vehicle and the stored traffic sign information that indicates the road edge location relative to the traffic sign.

In some examples, a technique for road edge detection may include initially detecting and recognizing a traffic sign and then estimating the road edge based on information about the recognized traffic sign stored in a storage. Additionally, the road plane may be determined based at least partially on the detected road edge and traffic sign height information stored in the storage. In some examples, traffic sign recognition logic may be executed for automatically recognizing roadside traffic signs. For instance, one or more cameras mounted on the vehicle may receive images of traffic signs in their respective fields of view as the vehicle travels on the road. The recognition logic may first detect one or more signs in a received image during a detection stage. Subsequently, during a recognition stage, the detected traffic sign may be identified as a particular type of traffic sign. As one example, the recognition stage may include tracking of the detected sign through a series of subsequent images of the sign to obtain sufficient visual information about the sign to perform recognition of the sign type of the sign. For instance, tracking of the detected sign through a plurality of subsequently captured images may improve accuracy of the recognition by providing a plurality of different images of the same sign for recognition. Further, the tracking of the sign through a sequence of multiple images may enable a more accurate determination of the location of the sign relative to the vehicle, a more accurate determination of the road edge relative to the sign, and, thereby, a more accurate determination of the likely location of the road edge relative to the vehicle.

In some cases, the implementations herein include one or more data structures of traffic sign information that are stored by the vehicle. The traffic sign information data structures may contain information for known types of traffic signs, which may include information about specific distances and heights at which each type of sign is likely to be positioned with respect to the road edge. For instance, the lateral distance of the traffic sign from the road edge and the height of the traffic sign from the road surface may depend on the type of traffic sign, and may be known based on sign-positioning specifications established for a particular jurisdiction or other geographic region in which the signs are located. Further, the sign positioning may be determined in part based on the type of road on which the vehicle is traveling, such as a rural road, an interstate highway, a road in a business, commercial, or residential area, or the like. Thus, recognition of a traffic sign as a particular type of traffic sign may be used to help estimate the likely location of the road edge even when the road edge is otherwise not visible.

There are many different types of traffic signs, which may be used at various different roadside locations for various purposes. Traffic signs may be broadly classified into a plurality of groups, such as regulatory signs, warning signs, guide signs, services signs, construction signs, recreation signs, pedestrian/bicycle signs, and incident management signs. The recognition logic herein is able to recognize signs within one or more captured images according to sign type. Furthermore, the spatial positioning of each type of traffic sign with respect to a particular type of road may be generally specified for each geographic jurisdiction in which the vehicle might travel. For instance, the height of a traffic sign from a road surface and the lateral positioning of the traffic sign from the road edge may depend on the sign type of the traffic sign. As one example, in the United States, the US Federal Highway Administration (FHWA) is a jurisdictional entity that may typically specify the minimum height and minimum lateral distance of various different types of traffic signs with respect to particular types of roads such as rural roads, highways, or roads in business, commercial, or residential areas. Accordingly, implementations herein may include one or more sign information data structures that store the height and lateral distance specified for various different types of traffic signs for various different geographic jurisdictions, such as various states within the United States, and/or various different countries in Europe, Asia, or other parts of the world in which the vehicle may be located.

In some examples, the data structure may include a lookup table that stores sign position information for the various different traffic sign types, which may include the height of each sign type from the road surface and the lateral distance of each sign type from the road edge. This database may include information obtained from various jurisdictional entities, such as the FHWA, state motor vehicle administrations, traffic authorities of other countries, and the like. Furthermore, in some cases, the database may include empirical information obtained for particular geographic jurisdictions, or the like. For example, information for traffic sign locations with respect to road edges and other road features may be determined during good weather and maintained in a log in each vehicle of a plurality of vehicles. The log information from the plurality of vehicles may be aggregated for a particular jurisdiction by a server or other service computing device. The aggregated empirical information may subsequently be provided to the vehicles and used to supplement, augment, and/or replace the sign information obtained from the jurisdictional entities. For example, not all traffic sign locations and heights might be in accordance with the specifications provided by the FHWA. Accordingly, the empirical sign position and road information collected by a plurality of vehicles when road edges are visible may be used subsequently when the road edge is not visible for determining the road edge location. Thus, implementations herein may employ a computer vision technology and/or one or more data structures of traffic sign and road information that are generated using a combination of empirical data and jurisdiction-specified sign position data and road data.

For discussion purposes, some example implementations are described in the environment of analyzing images for determining a road edge and road plane for autonomous and semi-autonomous vehicles. However, implementations herein are not limited to the particular examples provided, and may be extended to other types of sensing devices, other types of vehicles, other types of data, and so forth, as will be apparent to those of skill in the art in light of the disclosure herein.

FIG. 1 illustrates an example 100 of detecting road information according to some implementations. In this example, an image 102 may be obtained by a sensor, such as a camera, onboard a vehicle (not shown in FIG. 1). The image 102 may correspond at least in part to the field of view of the camera. A road detection system in the vehicle may analyze the image 102 to recognize the road and various other features. For instance, when the image 102 is captured, suppose that the vehicle is traveling along a road 104 behind a second vehicle 106. In this example, a road edge 108 is visible in the image 102. Also visible are a first lane indicator line 110 and a second lane indicator line 112. Thus, the area between the first lane indicator line 110 and the road edge 108 may be determined to be a shoulder 114 of the road 104, and the area between the first lane indicator line 110 and the second lane indicator line 112 may be determined to be a travel lane 116.

Additionally, in this example, suppose that the road detection system has recognized a traffic sign 118 in the image 102. As discussed additionally below, the road detection system may use the traffic sign 118 to determine the location and/or help confirm the location of the road edge 108. For example, following a recognition of the sign type of the traffic sign 118, the road detection system may refer to a sign information data structure (not shown in FIG. 1) to determine a likely lateral distance 120 from the traffic sign 118 to the road edge 108 and a likely vertical height 122 of the traffic sign 118 from the road edge 108 or other road surface. Based on this information, the road detection system may determine a likely target area of the image in which to attempt to recognize the road edge 108. Additionally, or alternatively, the road detection system may identify the road edge 108 with an increased level of confidence based on the sign position information.

Furthermore, if the road edge 108 can be identified with a threshold level of confidence without use of the position of the traffic sign 118 and the sign information data structure, then the road detection system may use the location of the road edge 108 to determine position information about the sign 118. For instance, the road detection system may determine from the image 102, the lateral distance 120 of the traffic sign 118 from the road edge 108 and may determine the vertical height 122 of the traffic sign 118 from the road edge 108 or other road surface. The road detection system may then store this information in a log along with geographic location information, such as may be obtained from a GPS (global positioning system) receiver or the like. Subsequently, the log information may be uploaded or otherwise sent over a network connection to a service computing device (not shown in FIG. 1) that may aggregate log information from a plurality of vehicles, and use the log information to improve the accuracy of the sign information data structure.

As indicated in image 124, the road edge 108 may be used at least partially to detect the road plane 126. For instance, road edge information for the right-side road edge 108 and a left side road edge (not shown in FIG. 1) may be used to define the left and right sides of the road plane 126, i.e., the road plane may extend between the right-side road edge 108 and the left-side road edge. Detection of the road edges and road plane is useful for both fully autonomous and semi-autonomous vehicles. In the case of a fully autonomous vehicle, detection of the road edges and road plane, as well as lane indicator lines 110 and 112, may be used to determine a free space 128, as shown in image 124. In this example, assume that the road detection system has determined that the second lane indicator line 112 is a centerline of the road, and that the road 104 is a two-lane road in which traffic traveling in the direction of the vehicle should stay to the right of the centerline. Accordingly, the free space 128 indicates the area in which a vehicle can drive. In other examples, such as in the case that the road 104 is a four-lane divided highway, the free space 128 might extend from the right-side road edge 108 to the left-side road edge.

For semi-autonomous vehicles, road edge and road plane determination may be used for a number of ADAS applications, such as lane departure warning, adaptive cruise control, emergency braking, and the like. For example, for a lane departure warning to function properly, it is typically useful to determine the road edge and the corresponding lane indicator lines. Further, road plane estimation may be used to help detect obstacles in the road, such as vehicles, bicycles, pedestrians, etc., that may be present on the road plane. Such detection may be used for adaptive cruise control and/or automatic emergency braking. For instance, in the example, of FIG. 1, determination of the road plain 126 may assist in detection of the vehicle 106, as well as the distance to and estimated speed of the vehicle 106, which may be used by adaptive cruise control and/or automatic emergency braking systems. Other obstacles, such as roadside trees and signs do not exist on the road plane, and therefor are typically not considered by the adaptive cruise control and/or automatic emergency braking systems.

Figure 2:
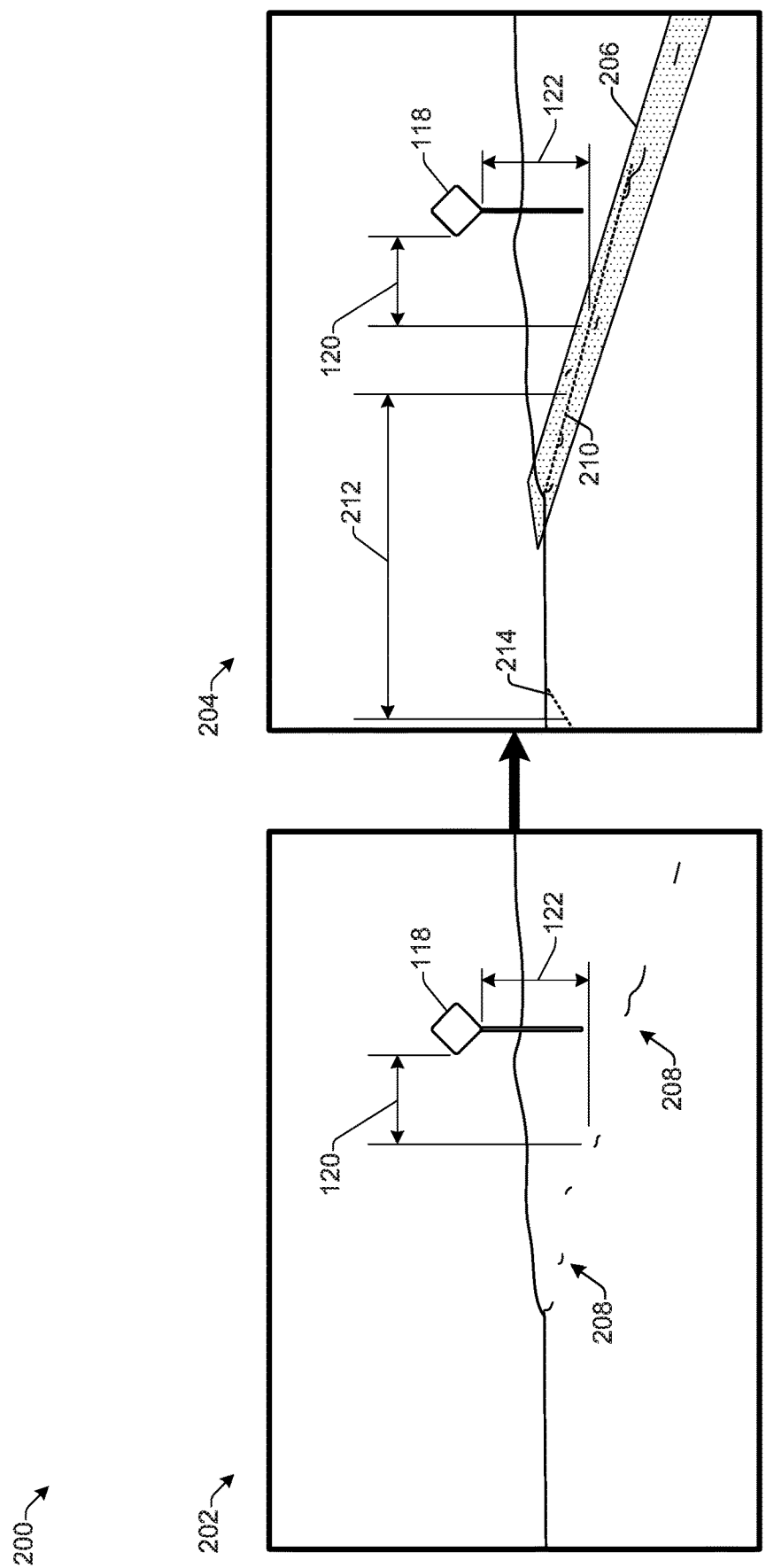
FIG. 2 illustrates an example of detecting road information according to some implementations.

FIG. 2 illustrates an example 200 of detecting road information according to some implementations. In this example, an image 202 may be obtained by a camera or other sensor onboard a vehicle (not shown in FIG. 2). In this example, suppose that the road edge is obscured, such as due to snow or the like. In such a case, the road detection system may have difficulty in detecting the road edge, and therefore may not be able to detect the road plane, travel lane, or the free space. In this example, suppose that the road detection system has detected and recognized the sign type of the traffic sign 118. Further, suppose that the road detection system has determined the likely lateral distance 120 of the traffic sign 118 from the road edge and the likely vertical height of the traffic sign 118 from the road surface (and thereby from the plane of the road). Based on these measurements, the road detection system can determine a target search area 206 of the image in which the road edge is likely to be located. Thus, the road detection system can focus on this area to detect the road edge, rather than having to analyze a larger area of the image 202. For instance, the road detection system may focus on analyzing features 208 visible within the target search area 206 for detecting the likely location of the road edge, such as for determining an estimated road edge 210 within a threshold level of confidence.

Furthermore, based on the likely location of the road edge, the road detection system may estimate the road plane and the left-side lane indicator line. For instance, a road information data structure (not shown in FIG. 2) may include information about typical lane widths, and shoulder widths for various different types of roads in the jurisdiction. Based on this road information, based on GPS information that indicates which road the vehicle is traveling on, and based on map information that indicates the type of road the vehicle is on, the road detection system may estimate a lateral distance 212 from the estimated road edge 210 to an estimated centerline 214 of the road. Thus, based on the location of the estimated centerline 214 and the location of the estimated road edge 210, the road detection system may determine the free space illustrated above with respect to FIG. 1.

Accordingly, implementations herein are able to determine a certain target search area 206 based on the recognized sign type of the traffic sign 118. This may typically enable faster detection of the road edge 210 because the road detection system is able to analyze the image 202 for brightness and texture changes or other disparities and features indicative of the road edge only in the target search area 206, rather over a larger area of the image 202. Further, in addition to detecting or estimating a likely location of the road edge, the road detection system may also estimate a middle position of the road, e.g., the centerline 214 of the road, so that a travel lane may be determined. Further, in some cases the size of the vehicle may be taken into consideration when determining a likely travel lane using the techniques herein. For example, when the vehicle is a truck or bus, the road edge estimation may error more toward the right than would be the case if the vehicle were a small car, especially when driving on or approaching a curve.

Computer vision techniques may be used to recognize the road edge in one or more images based on detecting contrasts, textures, edges, and other features in the one or more images. In some cases, even if the road is not covered with snow, it may be difficult to identify the road edge in the one or more images using conventional computer vision techniques. This may be due to different road and roadside conditions, intensity variations, low contrast, or other issues. In some cases, a number of threshold values or parameters may be used to determine the textures or other features in an image. These threshold values may be kept constant during the image processing to avoid long processing times. For example, changing threshold values might be used to better determine the road edge in some cases, but this may typically not be performed due to the long processing time for analyzing an entire image. However, in implementations herein, the target search area 206 may be used as input information for further image processing to obtain an accurate estimation of the road edge more quickly.

Following determination of the target search area 206 for the road edge within the image 202, the image 202 may be cropped or otherwise manipulated to exclude areas outside the target search area 206. Various computer vision techniques, such as feature detection, edge detection, texture analysis, and the like may be performed on the cropped region corresponding to the target search area 206. Accordingly, since the cropped target search area 206 of the image is substantially smaller than the full image 202, implementations herein are able to more quickly search the cropped target search area 206 of the image for textures, edges, and other features 208, according to various different threshold values within a smaller amount of time than would be the case if a larger area of the image 202 were to be searched. This may be useful to estimate accurately the likely location of the road edge 210. In addition, while the examples above are described in the context of images captured by a camera, other types of sensors may be used in addition to, or as an alternative to, cameras, such as LIDAR, radar, and ultrasound sensors.

Figure 3:
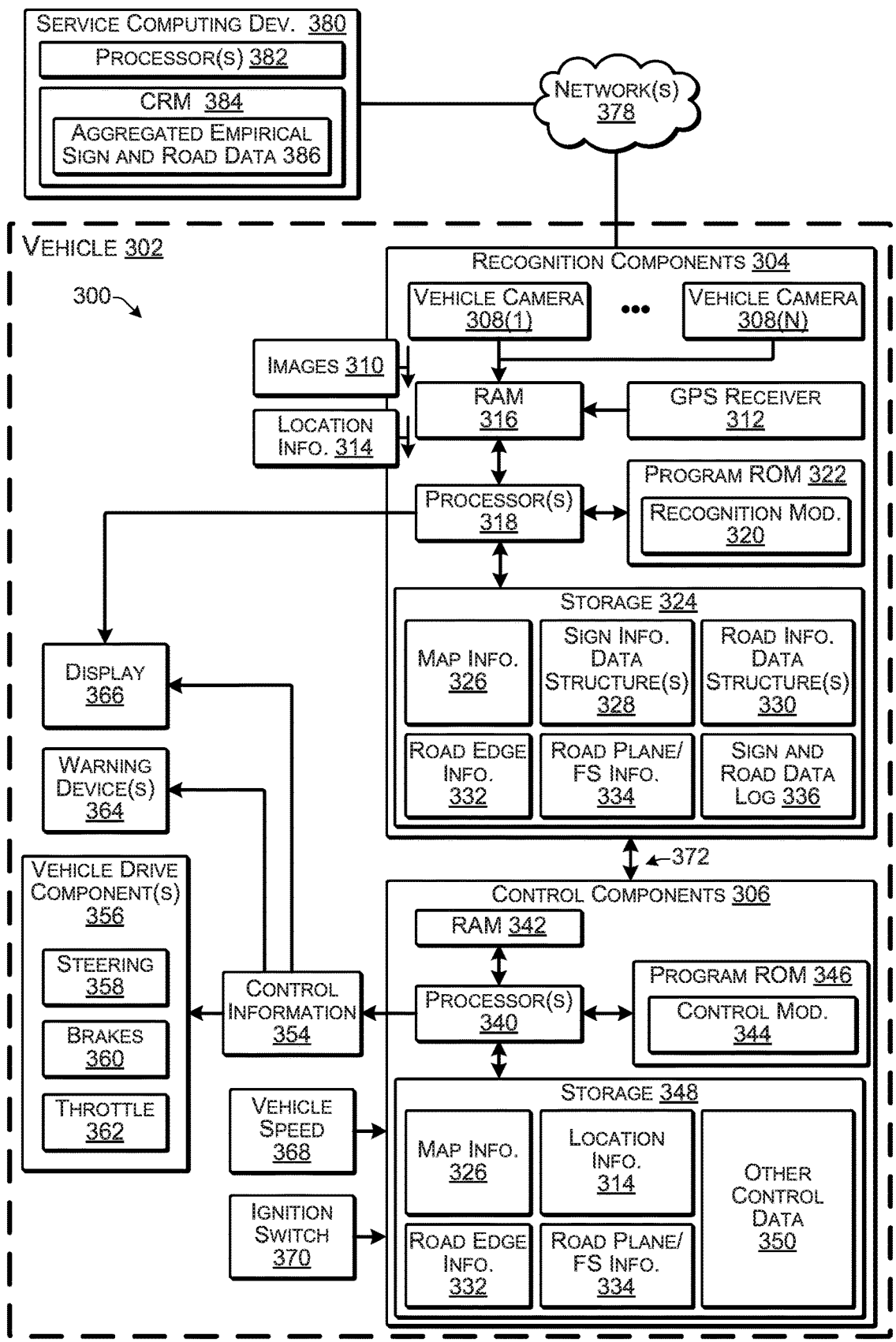
FIG. 3 illustrates an example architecture of a road detection and vehicle control system that may be included in a vehicle according to some implementations.

FIG. 3 illustrates an example architecture of a road detection and vehicle control system 300 that may be included in a vehicle 302 according to some implementations. The system 300 includes a plurality of recognition components 304, and a plurality of control components 306. Together, the recognition components 304 and the control components 306 may be used by the vehicle 302 for detecting a road and performing autonomous and/or semi semi-autonomous navigation along the road, executing ADAS functions, or the like. Furthermore, while the recognition components 304 and control components 306 are shown separate from each other in this example, in other examples, some of these components may be combined, may be provided in different configurations, and/or the some of the functionality may be provided by different components. Accordingly, implementations herein are not limited to the particular system and hardware configuration illustrated, and may be extended to various other configurations, as will be apparent to those of skill in the art having the benefit of the disclosure herein.

The recognition components 304 may include one or more sensors, such as one or more vehicle cameras 308(1)-308(N) in this example. For example, the vehicle camera(s) 308 may include a mono camera, a stereo camera, and/or multiple cameras, which may be mounted on the vehicle in one or more locations. The vehicle cameras 308 may continually capture a plurality of images 310 of the vehicle's surroundings, such as in the forward-facing direction, the rear-facing direction, and the side facing directions. For instance, each camera 308 may capture a specified number of images 310 per second. In some examples, the rate of image capture may be related to the speed of the vehicle or other variables, while in other examples, the rate of image capture may be constant.

In addition, the recognition components 304 include a GPS receiver 312 able to continually receive location information 314 regarding the geographic location of the vehicle 302. The images 310 captured by the cameras 308 and the location information 314 from the GPS receiver 312 may be initially stored in RAM (random-access memory) 312 or other computer-readable medium (CRM). The images 310 and the location information 314 may be accessed by one or more processors 318 for performing the recognition function herein. For example, a recognition module 320 stored or otherwise maintained in a program ROM (read only memory) 322 or other CRM may be executed by the one or more processors 318 for recognizing a road edge, road plane, free space, travel lane, and/or other road information.

The recognition module 320 may include one or more algorithms as described herein that are executed by the one or more processors 318. Furthermore, during the execution of the recognition module 320, the recognition module 320 may access a storage 324, such as a memory or other CRM that includes data and/or data structures used by the recognition module 312. Examples of data and data structures used by the recognition module 320 include map information 326, one or more sign information data structures 328, one or more road information data structures 330.

As discussed above, the recognition module 320 may be executed by the one or more processors 318 to recognize a roadside traffic sign, such as by determining the sign type of the traffic sign and the location of the traffic sign relative to the vehicle's coordinate system or other frame of reference. After, the traffic sign is recognized, in some cases, road edge information 332 may be determined based on information about the identified traffic sign included in the sign information data structure 328, the estimated distance of the traffic sign from the vehicle, and lateral and vertical measurements of the traffic sign determined by the recognition module 320.

Further, based partially on the road edge information 332 for one or more likely road edges, road plane and/or free space information 334 may also be determined. In some examples, the map information 326 and the geographic location information 314 may be used to determine a type of road upon which the vehicle 302 is traveling, which information may be used in conjunction with the road information data structure 330 to determine one or more of a road type, a centerline location, a width of the road, a travel lane width, a shoulder width, or the like. Alternatively, such as in the case that the location of the sign with respect to the road edge and/or the road information may be determined from the one or more of the images 310 with a high level of confidence (e.g., 85%, 90%, or higher), the recognition module 320 may store this sign position information and/or the road information in the sign and road data log 336.

In some examples, the camera field of view may be sufficiently wide to capture the road in front of the vehicle and any roadside objects. After an image 310 is captured, the recognition module may preprocess the captured image to reduce any noise. The preprocessed image may next be analyzed using computer vision techniques to attempt to detect a sign within the image. If a sign is detected within the image 310 within a first threshold level of confidence, then a recognition classifier may be used use to identify the detected sign as a particular type of traffic sign within a second, higher threshold level of confidence. In some examples, a tracking technique across multiple captured images 310 may be used for recognizing the sign and for determining the sign location on the image for improving the sign detection performance over the use of a single image. Furthermore, in some examples, the recognition module may use a difference in images ("parallax") taken from multiple points of view, such as may be obtained when an image of the same measurement point is imaged by a plurality of cameras 308. For instance, the recognition module may determine the likely location of a road edge in relation to the vehicle based at least partially on a difference between a first position of the sign in a first image and second position of the sign in a second image, such as where the first image is taken by a first camera or through a first aperture of a stereo camera and the second image is taken by a second camera or through a second aperture of a stereo camera. Thus, the recognition module is able to obtain a distance to a sign, road edge, or other road features based on the principle of triangulation. For example, assuming that a distance to a target is Z, a distance between the cameras (or between two apertures of a stereo camera) is B, a focal length of the camera is f, and a parallax is δ, the distance to the target Z can be obtained by the following equation:

$$Z=B \times f/\delta \tag{EQ1}$$

Additionally, or alternatively, other computer vision techniques may be used to determine the position of a sign relative to the vehicle's frame of reference, such as based on the position of the sign in a captured image, the size of the sign relative to the field of view of the image, a change in size and position of the sign in the field of view from one image to the next image as the vehicle advances at a known speed, and so forth. Accordingly, using these and/or other techniques, the recognition module 320 is able to measure a lateral distance of a recognized sign to a road edge or to a location where a road edge is expected. Similarly, the recognition module is able to determine a vertical height of the recognized sign above a road edge or above a location where a road edge is expected, as well as other distances, such as a distance to the sign, a width of the road, a width of the shoulder, a width of a travel lane, and so forth.

As mentioned above, in some examples, the recognition module 320 may detect the road edge information 332 and the road plane and/or free space information 334 based at least in part on sign location information contained in the sign data structure 328. Alternatively, in other examples, the recognition module 320 may be able to detect the road edge using other computer vision techniques without reliance on the sign information in the sign data structure. In such a case, in which the road edge is detected within a threshold level of confidence, the recognition module 320 may determine the position of the sign relative to the detected road edge, and may record the lateral distance between the sign and the road edge and the vertical distance from the road surface to the sign in the sign and road data log 336. The current geographic location of the vehicle (and thereby the geographic location of the sign) may also be recorded in the sign/road data log. Further, in some examples, the width of the road from the road edge, the width of the travel lane, the width of the shoulder, and/or the width of the free space may also be periodically recorded in the log 336.

After the road edge information 332 and/or the road plane and/or free space information 334 has been determined, this information may be made available to the control components 306. The control components 306 may include one or more processors 340 and RAM 342. A control module 344 stored or otherwise maintained in a program ROM 346 or other CRM may be executed by the one or more processors 340 for performing the control functions described herein. For example, the control module 344 may access a storage 348 that includes the road edge information 332 and the road plane and/or free space information 334, which may be used by the control module 344 for performing for one or more control functions. In some examples, the storage 348 may be the same as storage 324, such as a shared storage, e.g., a shared memory or other shared CRM. In other examples, the storage 348 may be separate from the storage 324. Further, in some cases, the road edge information 332 and/or the road plane and/or free space information 334 may be sent from the processor(s) 318 to the processor(s) 340 directly and stored in the RAM 342 for use by the control module 344. In addition, the storage 348 may store the location information 314 and various other types of data used by the control module, referred to herein as other control data 350.

Based on the road edge information 332 and the road plane and/or free space information 334, the control module 344 may generate control information 354, which may include one or more control signals or other information. For example, the control information 354 may be sent to one or more vehicle drive components 356, such as steering 358, brakes 360, and/or throttle (engine or motor speed control) 362. Thus, the control module 344 may generate one or more control signals for steering the vehicle, braking the vehicle, and/or controlling the speed of the vehicle. Additionally, or alternatively, the control module 344 may generate the control information 354 for sending a control signal to one or more warning devices 364. Examples of warning devices 364 include speakers that may generate an audible alert, haptic devices that may generate a vibration or other type of tactile alert (e.g., in a seat or steering wheel), and/or a visual signaling device that may generate a visual alert.

Furthermore, the control information 354 may be sent to a display 366, which may present information to an occupant of the vehicle 302, such as for providing information to the occupant regarding the road, the path of the vehicle, or the like. In some examples, one or more of the images 310 may also be presented on the display 366, and the control information 354 may be overlaid on or otherwise used to enhance the images 310. The display 366 may be, for example, a display device such as a liquid crystal display, organic light-emitting diode display, or the like. The display 366 may display various images such as an image of a travel route for a navigation system (not shown) and/or one or more of the images 310 under control of the control module 340. In addition, when the control module 340 generates a control signal 354 including an alert, information related to the alert may be presented on the display 366.

Additionally, in some examples, the current vehicle speed 368 or other information may be input to the control module 340 from other subsystems in the vehicle, such as the throttle control, speedometer, or the like. For instance, the vehicle speed 368 may be used at least at least partially to determine the control information 354.

Furthermore, a condition of an ignition switch 370 may be an indicator to the recognition module 320 and/or the control module 344 of whether to perform road detection. For instance, a series of processing operations may be initiated when the ignition switch 370 is turned on, and may be repeatedly performed until the ignition switch 370 is turned off. In some cases, the series of processing operations may be performed regardless of whether the vehicle 302 is traveling or stopped. For example, when the ignition switch 370 is turned on, the recognition module 320 may begin execution of one or more processes, such as by using the cameras 308 to capture images 310, and analyzing the captured images 310 to detect a road edge and other road features. In some cases, the cameras 308 may be used to continually capture images 310 while the ignition switch is in the on position.

In some examples, the processor(s) 318 and/or 340 may be processors included in one or electronic control units (ECUs) in the vehicle 302. For example, ECU is a generic term for any embedded system that controls one or more of the systems, subsystems, or components in a vehicle. Each ECU may include one or more processors, a memory, and digital and/or analog communication interfaces (not shown in FIG. 3). Software, such as the recognition module 320 and the control module 344, for execution by a particular ECU, may be stored in a portion of the memory (e.g., program ROM) associated with the respective ECU to enable the ECU to operate as an embedded system. ECUs may typically communicate with each other over a vehicle bus 372 according to a vehicle bus protocol. As an example, the Controller Area Network bus (CAN bus) protocol is a vehicle bus protocol that allows ECUs and other devices to communicate with each other without a host computer. CAN bus may include at least two different types. For example, high-speed CAN may be used in applications where the bus runs from one end of the environment to the other, while fault-tolerant CAN is often used where groups of nodes are connected together. Alternatively, in some examples, the processors 318 and/or 340 may include other types of computing devices, such as central processing units (CPUs), graphics processing units (GPUs), microprocessors, microcomputers, microcontrollers, digital signal processors, state machines, logic circuitries, or the like.

In addition, the storages 324 and 348 may include, but are not limited to, RAM, ROM, EEPROM, flash memory, or other memory technologies, optical storage, solid state storage, magnetic device storage, or any other medium that can be used to store the desired information and that can be accessed by a computing device. Depending on the configuration of the recognition components and the control components, the storages 324 and 348 may be a type of computer-readable storage medium and/or may be a tangible non-transitory medium to the extent that when mentioned, non-transitory computer-readable media exclude media such as energy, carrier signals, electromagnetic waves, and/or signals per se.

In addition, in some implementations, the recognition module 320 or other module executed in the vehicle 302 may be configured to communicate over one or more networks 378 with one or more service computing devices 380. For example, the recognition module 320 may send some or all of the sign and road data log 336 to the service computing device(s) 380 over the one or more networks 378. The service computing device(s) 380 may include one or more processors 382 and one or more CRM 384.

The service computing device(s) 380 may receive the sign and road data logs 336 from a plurality of vehicles 302, and may aggregate the received log information as aggregated empirical sign and road data 386. As mentioned above, the sign and road data log 336 recorded by each vehicle may include information about various types of traffic signs that each vehicle has recognized, the distance of each recognized sign from the road edge, the height of each recognized sign from the road surface, and the geographic location of the recognized sign. In addition, the sign and road data log 336 may include road information determined by each vehicle 302, such as the detected width of roads at various locations (e.g., adjacent to recognized signs or at other locations, such as determined periodically), the distance from the road edge to a centerline of the road, the width of a shoulder from the road edge, the width of a travel lane, the free space of the road, and so forth.

The service computing device(s) 380 may aggregate the information from the plurality of received sign and road data logs 336 to determine actual distances of various different types of signs from the road edge in various different jurisdictions and various different locations. In some cases, the service computing device may determine a range of distances associated with each sign type for each jurisdiction. For example, the service computing device may determine that in a particular state, the warning signs on rural roads are likely to be between 13-14 feet from the road edge if there is no shoulder or 7-8 feet from the road edge when there is a shoulder. In other cases, the service computing device 380 may compile a more detailed data structure that includes the lateral distance from the road edge and height of specific signs at specific geolocations on specific roads, and the specific width of the roads, travel lanes, and the like, at the specific geolocations. The service computing device 380 may update or otherwise generate the sign information data structure(s) 328 and the road information data structure(s) 330 based on the aggregated empirical sign and road data 386. The service computing device 380 may send these updated data structures 328 and 330 to the vehicle 302, and the recognition module may use the updated data structures 328 and 330 when determining road edge, free space, and the like.

The vehicle 302 may be able to communicate wirelessly with the one or more networks 378, or, in some cases, through a wired connection. The one or more networks 378 may include any type of network, including a wide area network (WAN), such as the Internet; a wireless network, such as a cellular network, a local wireless network, such as Wi-Fi, and/or short-range wireless communications; a wired network including fiber optics, Ethernet, or any other such network, a direct wired connection, or any combination thereof. Accordingly, the one or more networks 378 may include both wired and/or wireless communication technologies. Components used for such communications can depend at least in part upon the type of network. Protocols for communicating over such networks are well known and will not be discussed herein in detail. Accordingly, the vehicle 302 and the service computing device(s) 380 are able to communicate over the one or more networks 378 through wireless connections, and combinations of wireless and wired connections.

In some examples, the one or more service computing devices 380 may include one or more servers or other types of computing devices that may be embodied in any number of ways. For instance, in the case of a server, the functional components and data storage may be implemented on a single server, a cluster of servers, a server farm or data center, and so forth, although other computer architectures may additionally, or alternatively, be used.

Each processor 382 may be a single processing unit or a number of processing units, and may include single or multiple computing units, or multiple processing cores. The processor(s) 382 can be implemented as one or more central processing units, microprocessors, microcomputers, microcontrollers, digital signal processors, state machines, logic circuitries, graphics processing units, and/or any devices that manipulate signals based on operational instructions. For instance, the processor(s) 382 may be one or more hardware processors and/or logic circuits of any suitable type specifically programmed or configured to execute the algorithms and processes described herein. The processor(s) 382 may be configured to fetch and execute computer-readable instructions stored in the CRM 384, which can program the processor(s) 382 to perform the functions described herein.

The CRM 384 may include volatile and nonvolatile memory and/or removable and non-removable media implemented in any type of technology for storage of information, such as computer-readable instructions, data structures, program modules, or other data. For example, the CRM 384 may include, but is not limited to, RAM, ROM, EEPROM, flash memory or other memory technology, optical storage, solid state storage, magnetic tape storage, magnetic disk storage, RAID storage systems, storage arrays, network attached storage, storage area networks, or any other medium that can be used to store the desired information and that can be accessed by a computing device. Depending on the configuration of the service computing device 380, the CRM 384 may be a type of computer-readable storage media and/or may be a tangible non-transitory media to the extent that when mentioned, non-transitory computer-readable media exclude media such as energy, carrier signals, electromagnetic waves, and/or signals per se. Further, the computing device 380 may include many other logical, programmatic, and physical components, of which those described above are merely examples that are related to the discussion herein.

Further, while FIG. 3 illustrates the components and data of the service computing device(s) 380 as being present in a single location, these components and data may alternatively be distributed across different computing devices and different locations in any manner. Consequently, the functions may be implemented by one or more computing devices, with the various functionality described above distributed in various ways across the different computing devices.

FIGS. 4A-4B and 5A-5B illustrate examples of traffic sign position information available from a jurisdictional entity according to some implementations. For instance, the service computing device may obtain information from various different jurisdictions for compiling a database of sign position and distance specifications that may be used by the vehicle for estimating an area where a road edge is likely be located, such as discussed above with respect to FIG. 2. One source of such information is the "Manual on Uniform Traffic Control Devices" (MUTCD) issued by the FHWA. The MUTCD contains recommended configurations for traffic control devices in the United States. The information obtain from the various jurisdictions may be made more accurate or otherwise updated using empirical data obtained as discussed above, e.g., with respect to FIG. 3.

Figure 4A:
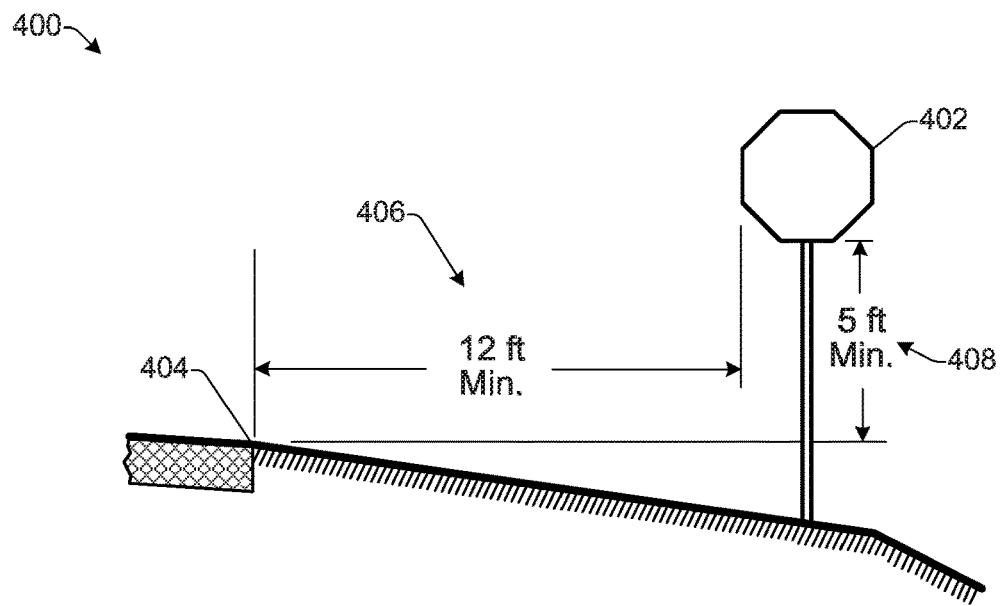
FIGS. 4A-4B illustrate examples of traffic sign position information available from a jurisdictional entity according to some implementations.

FIG. 4A illustrates an example specification 400 obtained from a jurisdictional entity for a stop sign 402 in a rural area according to some implementations. In this example, the specification is for a road that does not have a paved shoulder. Accordingly, the road edge 404 in this situation is also the edge of the travel lane. As set forth by the specification in FIG. 4A, a lateral distance from the sign 402 to the road edge 404 is a minimum of 12 feet, as indicated at 406. Further, a vertical height of the sign 402 from the road edge 404 is a minimum of 5 feet, as indicated at 408.

Figure 4B:
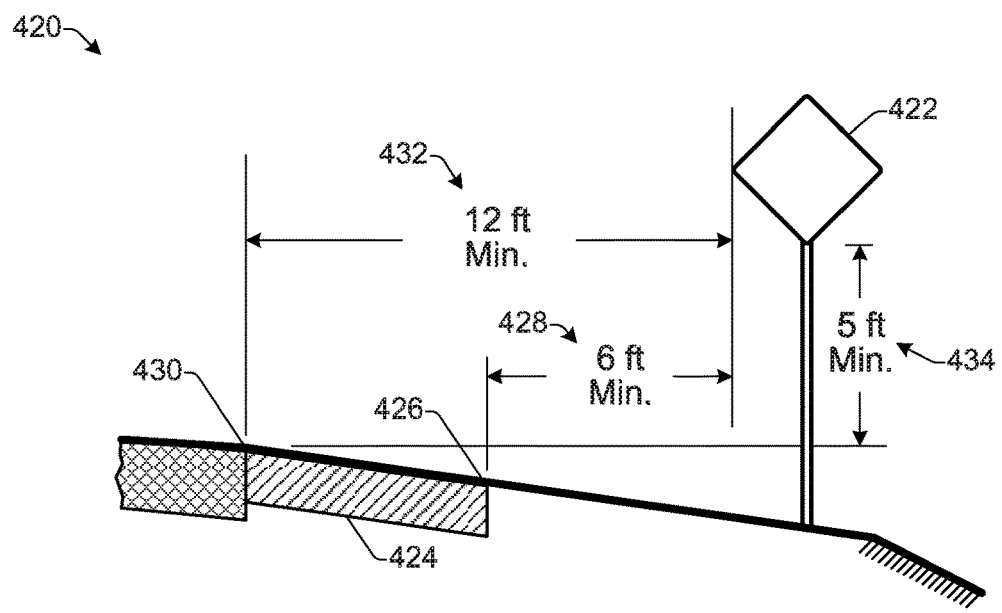

FIG. 4B illustrates an example specification 420 obtained from a jurisdictional entity for a warning sign 422 in a rural area according to some implementations. In this example, the specification is for a road that includes a paved shoulder 424. Accordingly, the road edge 426 in this situation may be the edge of the shoulder 424. As set forth by the specification in FIG. 4B, a lateral distance from the sign 422 to the road edge 426 is a minimum of 6 feet, as indicated at 428. Furthermore, a lateral distance from the sign 422 to the edge 430 of the travel lane is a minimum of 12 feet, as indicated at 432. In addition, a vertical height of the sign 422 from the road surface at the edge 430 of the travel lane is a minimum of 5 feet, as indicated at 434.

Figure 5A:
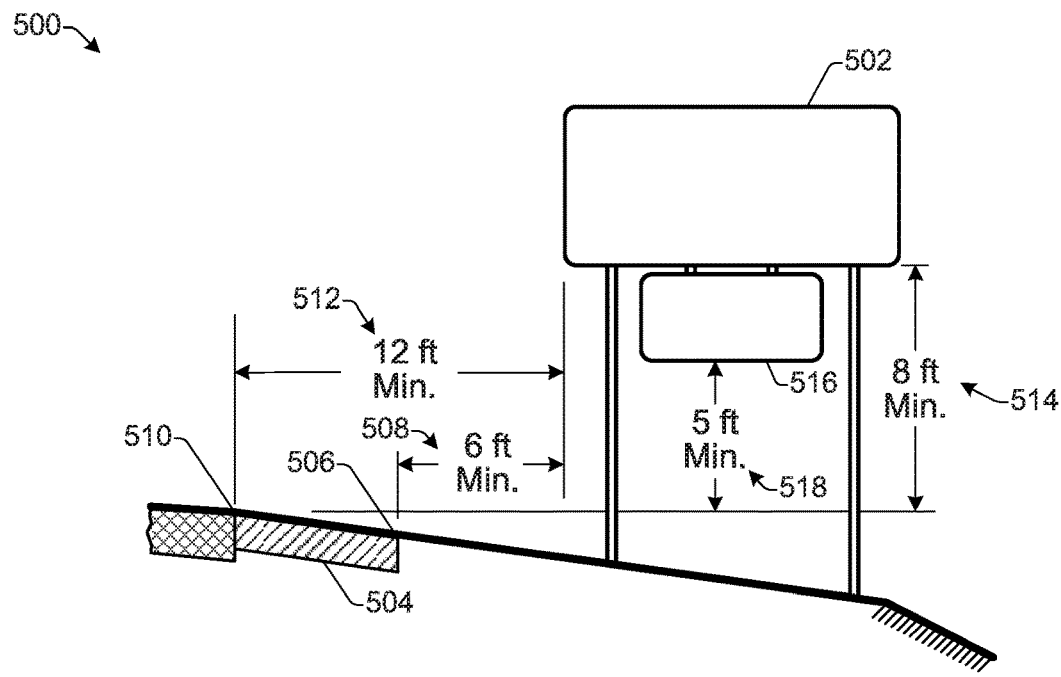
FIGS. 5A-5B illustrate examples of traffic sign position information available from a jurisdictional entity according to some implementations.

FIG. 5A illustrates an example specification 500 obtained from a jurisdictional entity for a guide sign 502 on a highway or freeway according to some implementations. In this example, the specification is for a road that includes a paved shoulder 504. Accordingly, the road edge 506 in this situation may be the edge of the shoulder 504. As set forth by the specification in FIG. 5A, a lateral distance from the sign 502 to the road edge 506 is a minimum of 6 feet, as indicated at 508. Furthermore, a lateral distance from the sign 502 to the edge 510 of the travel lane is a minimum of 12 feet, as indicated at 512. In addition, a vertical height of the sign 502 from the edge 510 of the travel lane is a minimum of 8 feet, as indicated at 514. Furthermore, in this example, a smaller second sign 516 is attached underneath the sign 502, and a vertical height of the second sign 516 from the road surface at the edge 510 of the travel lane is a minimum of 5 feet, as indicated at 518.

Figure 5B:
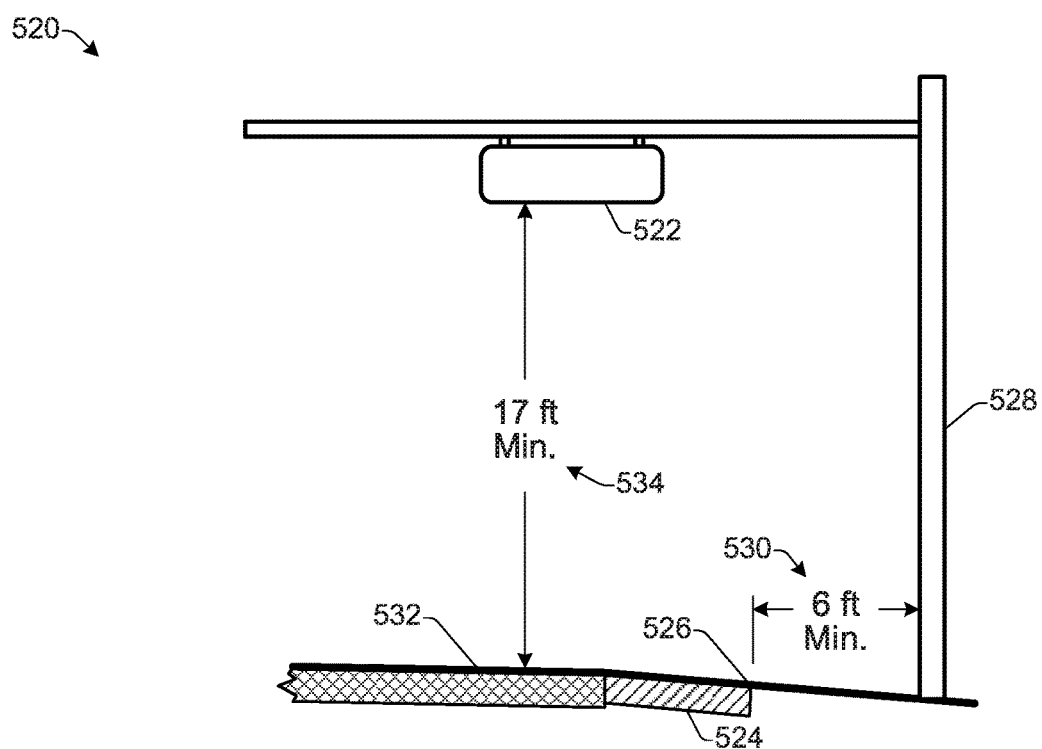

FIG. 5B illustrates an example specification 520 obtained from a jurisdictional entity for an overhead guide sign 522 according to some implementations. In this example, the specification is for a road that includes a paved shoulder 524. Accordingly, the road edge 526 in this situation may be the edge of the shoulder 524. As set forth by the specification in FIG. 5A, a lateral distance from a pole 528 that supports the sign 522 to the road edge 526 is a minimum of 6 feet, as indicated at 530. In addition, a vertical height of the sign 522 from the road surface 532 of the travel lane is a minimum of 8 feet, as indicated at 534.

Figure 6A:
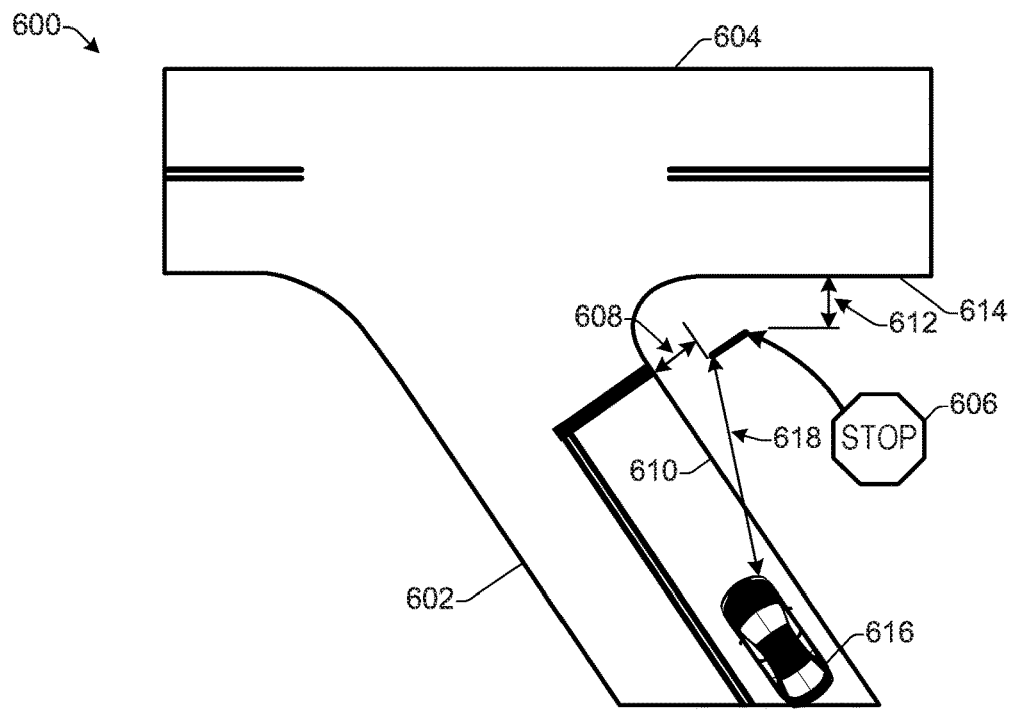
FIGS. 6A-6B illustrate examples of intersection information that may be used to determine traffic sign position information at various types of intersections according to some implementations.
Figure 6B:
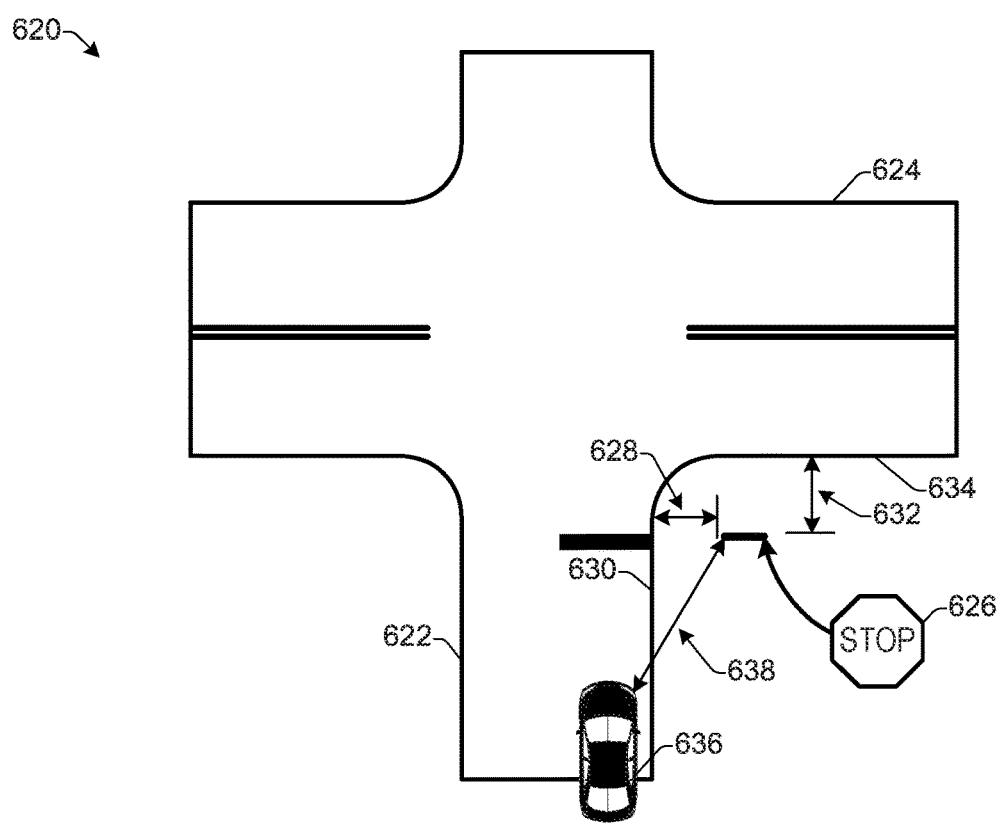

FIGS. 6A-6B illustrate examples of intersection information that may be used to determine traffic sign position information at various types of intersections according to some implementations. For instance, as mentioned above, some traffic sign positions (e.g., lateral distance and height) may depend on the type of road (e.g., freeway, city road, rural road, etc.) and type of intersection. Thus, implementations herein may determine the geographic location of the vehicle in advance (e.g., using a GPS receiver) and may compare the geographic location with map information to determine the type of road and/or intersection.

FIG. 6A illustrates an example intersection 600 in which a first road 602 intersects with a second road 604 at an oblique angle. In this example, a stop sign 606 is specified to be positioned a minimum of a first distance 608 from an edge 610 of the first road 602. Furthermore, the stop sign 606 is specified to be positioned a minimum of a second distance 612 from an edge 614 of the second road 604. Thus, a vehicle 616 approaching the intersection 600 may determine a distance 618 to the sign 606 using the techniques discussed herein, and may further determine the location of the road edge 610 based on the distance 608, or vice versa.

FIG. 6B illustrates an example intersection 620 in which a first road 622 intersects with a second road 624 at a right angle. The first road 622 may be a minor road and the second road 624 may be a major road. In this example, a stop sign 626 is specified to be positioned a minimum of a first distance 628 from an edge 630 of the first road 622. Furthermore, the stop sign 626 is specified to be positioned a minimum of a second distance 632 from an edge 634 of the second road 624. Thus, a vehicle 636 approaching the intersection 600 may determine a distance 638 to the sign 626 using the techniques discussed herein, and may further determine the location of the road edge 630 based on the distance 628, or vice versa.

In some cases, the target search area in an image that is searched for the road edge may differ based, e.g., on the type of sign recognized. As a first example, suppose that the sign recognized by the road detection system is a traffic speed limit sign. Thus, in this example, as discussed above with respect to FIG. 2, the road detection system may establish a target search area 206 within the image 202 so that the target search area 206 for the road edge is established in the vehicle driving direction (e.g., a longitudinal direction corresponding to the direction of travel). On the other hand, as a second example, suppose that the sign recognized is a "stop" sign, as shown in FIG. 6B. In this second example, the road detection system may determine the target search area 206 for the road edge within the image 202 to include a target search area that is lateral to the direction of travel. Thus, the target search area 206 may include an area that is intersected with the vehicle's direction of travel, e.g., for searching in a lateral direction to the direction of travel in addition to, or as an alternative to, searching for the road edge in the longitudinal direction of travel. For instance, the searching in the lateral direction may be performed to identify road edges or other features of an intersection or a cross road that the vehicle is approaching.

Figure 7:
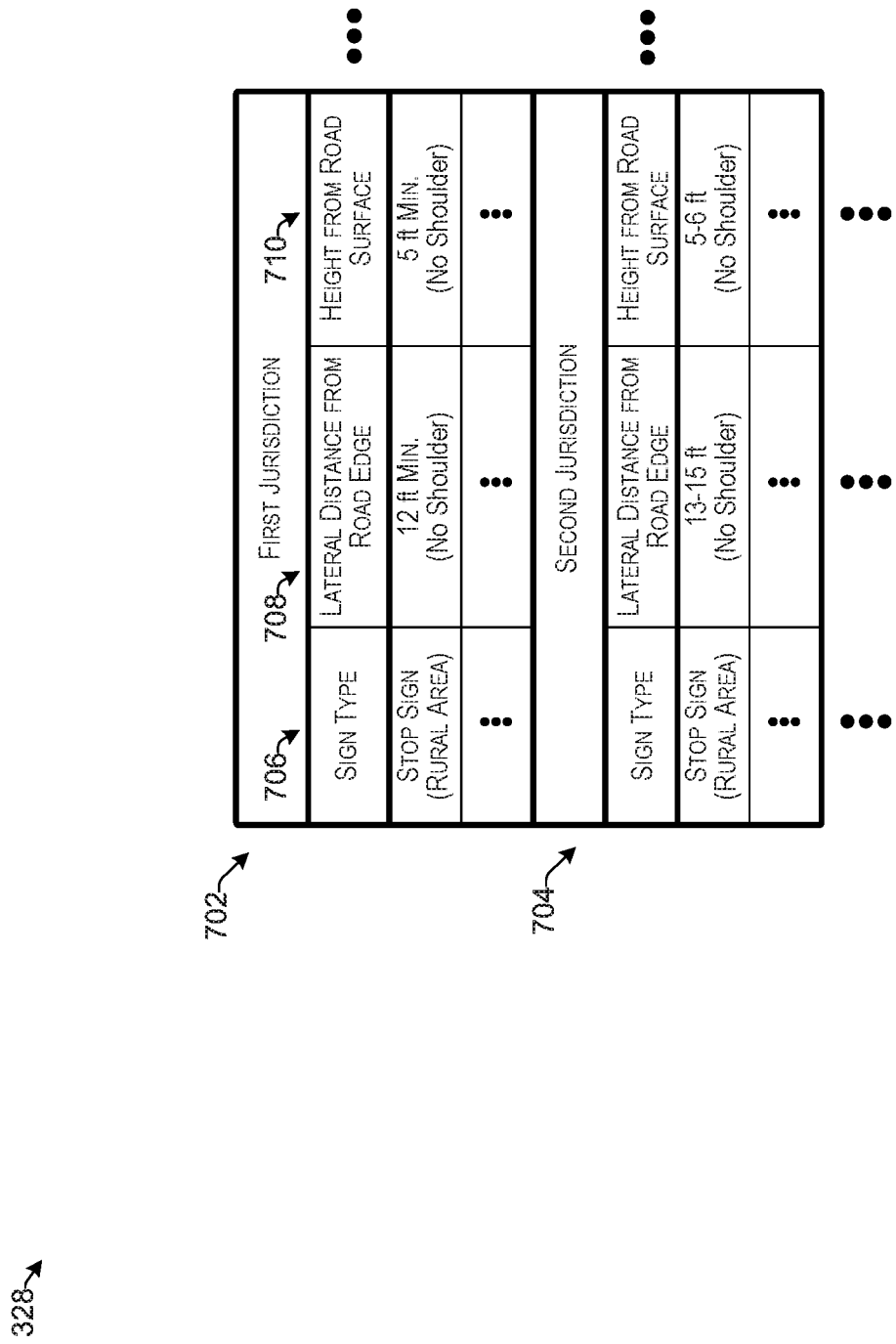
FIG. 7 illustrates an example sign information data structure for storing sign information according to some implementations.

FIG. 7 illustrates an example sign information data structure 328 for storing sign information according to some implementations. In this example, the sign information data structure includes sign information for a plurality of geographic jurisdictions, including a first jurisdiction 702 and a second jurisdiction 704. For example, the data structure 328 may include a sign type 706, a lateral distance 708 from the road edge, and a height 710 from the road surface 710. For example, the lateral distance 708 from the road edge may be to the edge of the shoulder in the case that the road includes a paved shoulder or, otherwise, to the paved edge of the road. Further, the height 710 may specify whether a shoulder is considered.

In some examples, the information entered in the data structure 328 may be initially obtained from a jurisdictional entity, such as the FHWA or state motor vehicle departments in the United States, or similar entities in other countries. The information may be subsequently supplemented, changed, or otherwise updated based on empirical data received from a plurality of vehicles that are able to detect a road edge within a threshold level of confidence and then determine the actual lateral and vertical distances of actual different types of signs in a particular geographic jurisdiction. As mentioned above, a remote service computing device may aggregate the empirical data from the plurality of vehicles and may change the entries, such as to a likely range for the lateral distance and the height of the individual sign type.

For example, in the second jurisdiction 704, suppose that the service computing device determined, based on the aggregated empirical data, that a stop sign on a rural road with no paved shoulder in the second jurisdiction is likely to be 13-15 feet in the lateral direction from the road edge, and 5-6 feet in vertical distance from the road surface. Thus, the service computing device may change the entries for 708 and 710 for the second jurisdiction in the data structure 328 in accordance with the empirical data. In some cases, the service computing device may consider both the jurisdiction-provided data and the empirical data, such as by ensuring that there is not a conflict between the jurisdiction-provided data and the empirical data, providing different weights to the jurisdiction-provided data and the empirical data, or the like. Further, while FIG. 7 illustrates one example of a data structure 328 for storing sign information, numerous other data structures, databases, types of data stored, and the like, will be apparent to those of skill in the art having the benefit of the disclosure herein.

FIG. 8 illustrates an example road information data structure 330 for storing road information according to some implementations. In this example, the road information data structure 330 includes road information for a plurality of geographic jurisdictions, including a first jurisdiction 802 and a second jurisdiction 804. For example, the data structure 330 may include a road type 806, a distance 808 from the right road edge to the centerline, a width 810 of the road surface, a width 812 of travel lane, and a width 814 of shoulder. For example, the distance 808 from the right road edge to the centerline may be measured from the edge of the shoulder in the case that the road includes a paved shoulder or, otherwise, from the paved edge of the road to the centerline of the road, such as in the case of a two-lane road. Further, the width of the road 810 may specify the total width of the road, the width 812 of the travel lane may specify how wide the travel lanes are, and the width 814 of the shoulder may specify the width of a paved shoulder, if any.

In some examples, the information entered in the data structure 330 may be initially obtained from a jurisdictional entity, such as the FHWA or state motor vehicle departments in the United States, or similar entities in other countries. The information may be subsequently supplemented, changed, or otherwise updated based on empirical data received from a plurality of vehicles that are able to detect a road edge, road plane and other road information within a threshold level of confidence and then determine the actual distances of the road features in particular geographic jurisdictions. As mentioned above, a remote service computing device may aggregate the empirical data from the plurality of vehicles and may update the entries in the data structure 330, such as to a likely range for the entries, as shown for the rural road in the second jurisdiction 804. In some cases, the service computing device may consider both the jurisdiction-provided data and the empirical data, such as by ensuring that there is not a conflict between the jurisdiction-provided data and the empirical data, by providing different weights to the jurisdiction-provided data and the empirical data, or the like. Further, while FIG. 8 illustrates one example of a data structure 330 for storing road information, numerous other data structures, databases, types of data stored, and the like, will be apparent to those of skill in the art having the benefit of the disclosure herein.

Figure 9:
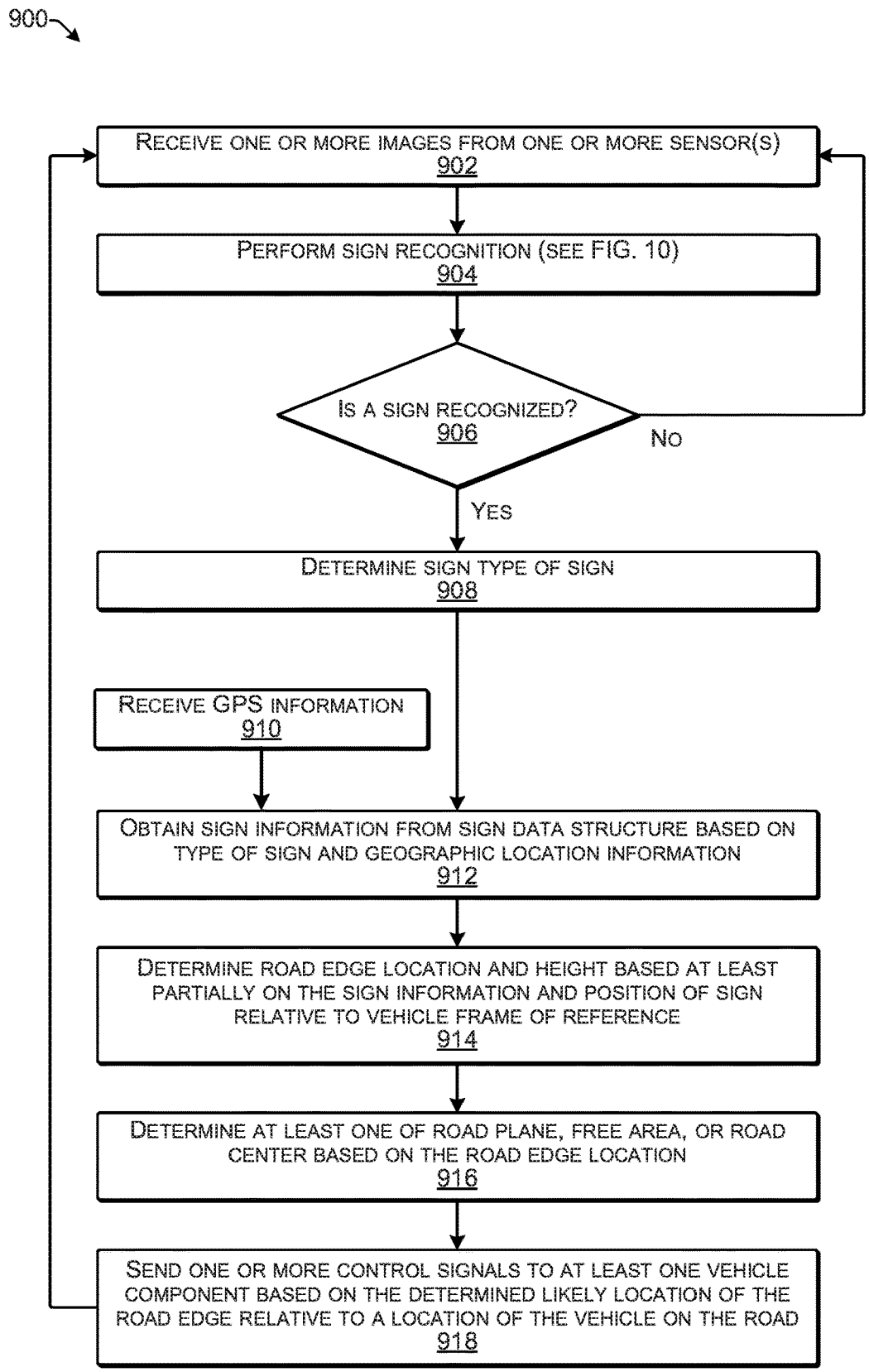
FIG. 9 is a flow diagram illustrating an example process for controlling a vehicle based on a detected road edge according to some implementations.
Figure 10:
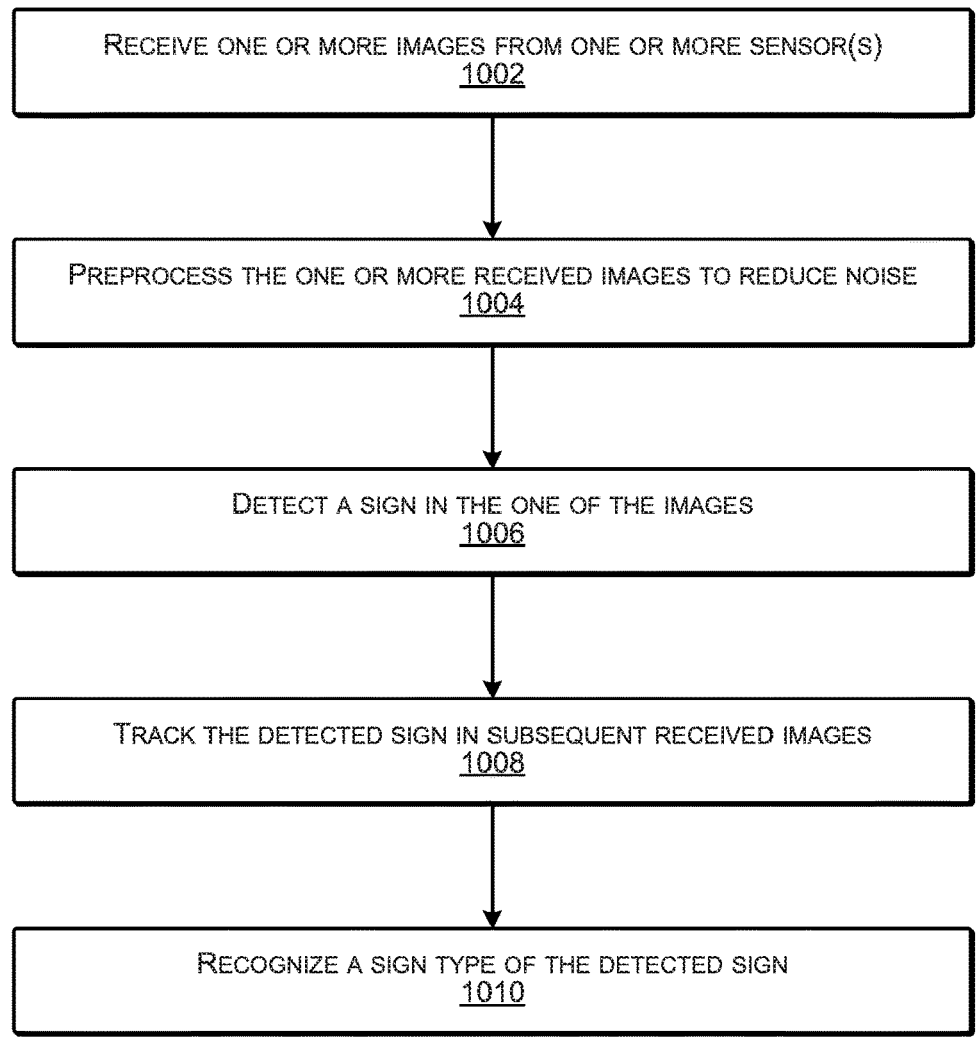
FIG. 10 is a flow diagram illustrating an example process for recognizing a traffic sign according to some implementations.
Figure 11:
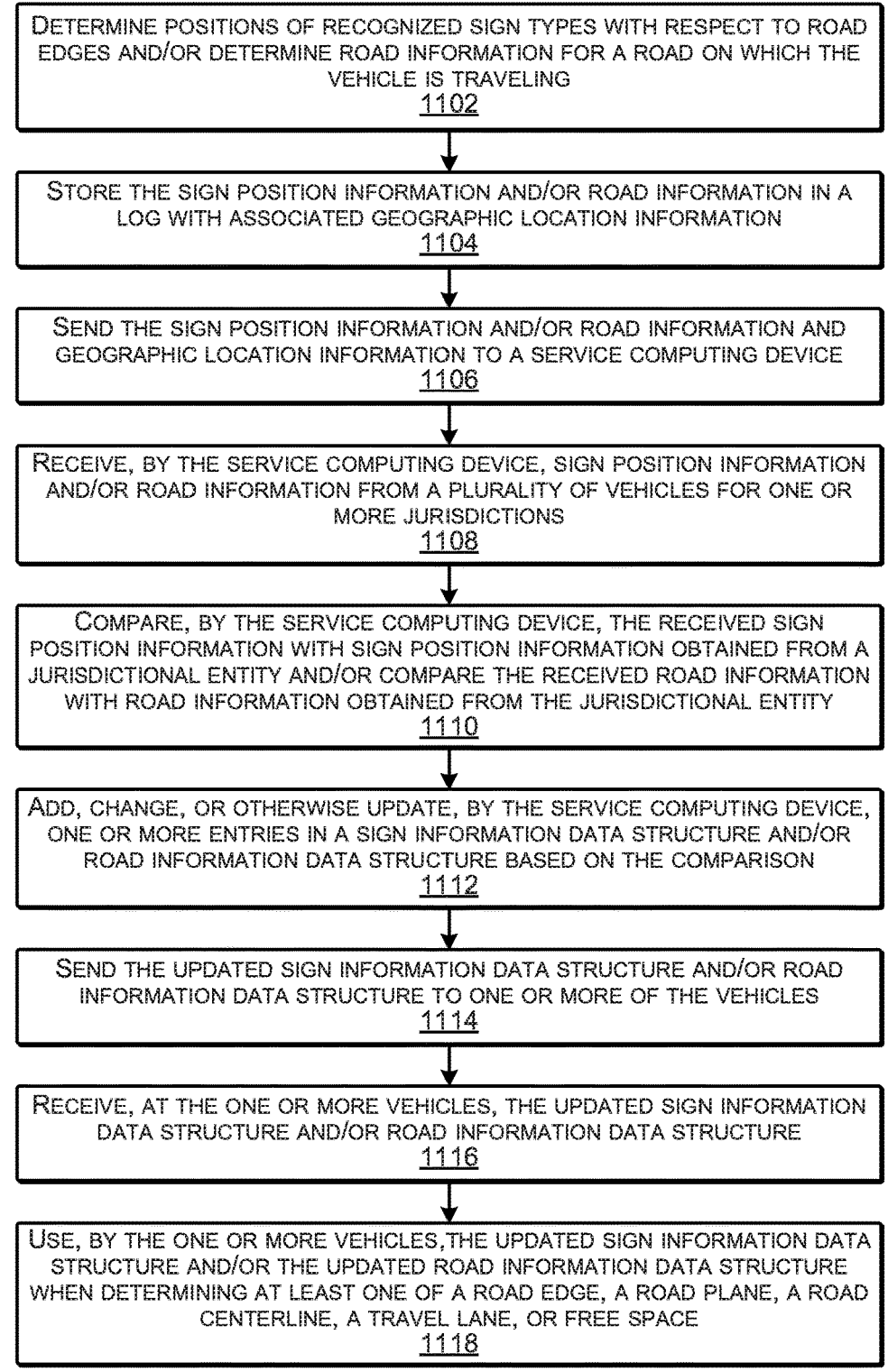
FIG. 11 is a flow diagram illustrating an example process for updating one or more data structures according to some implementations.

FIGS. 9-11 illustrate example processes according to some implementations. The processes are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, frameworks, and systems described in the examples herein, although the processes may be implemented in a wide variety of other environments, frameworks, and systems.

FIG. 9 is a flow diagram illustrating an example process 900 for controlling a vehicle based on a detected road edge according to some implementations. In some examples, the process 900 may be performed by one or more processors executing the recognition module and the control module. After an image is captured, the recognition module may be executed to detect a sign and recognize of sign type of the sign. If a sign is detected and recognized, the sign information data structure is accessed to determine a likely road edge location and road height based on GPS data and the recognized sign type. Road plane may be calculated using the road edge and road height.

Further, implementations herein may detect and recognize signs on the both sides of a road. For instance, the sign type of traffic signs typically may be recognized by the shape of the sign. Further, the back of a traffic sign may usually be distinguished from the front based on the presence of text or symbols, or lack thereof, the location of a pole or other support, and so forth. Thus, in some cases, the road edge on both the left side and the right side of a road may be estimated based on recognized signs on both the left side and the right side of the road. The road plane may be calculated considering the flat or typically rounded road surface likely to exist between the two road edges. Further, in some cases for determining a lateral distance from the recognized sign, the system may generate a 3D depth map from one or more images captured by one or more sensors and/or based on parallax determined between two images obtained from different perspectives, such as by using a stereo camera, multiple cameras, or multiple images taken at different points in time, e.g., as the vehicle moves at a known velocity. The one or more images may be related to a frame of reference of the vehicle to determine the location of the road edges with respect to the vehicle location.

At 902, the one or more processors may receive one or more images from one or more sensors. For example, in the case that the sensors include one or more cameras, the images may be obtained using visible light, infrared light, or both. Further, the one or more images may be obtained additionally, or alternatively, using other sensing technologies, or combinations thereof, such as LIDAR, radar, ultrasound, and so forth.

At 904, the one or more processors may perform sign recognition using the one or more images. An example sign recognition algorithm and process is discussed additionally below with respect to FIG. 10.

At 906, the one or more processors may determine whether a sign is recognized. If a sign is recognized, the process may proceed to block 908. If not, the process may return to block 902 to receive one or more additional images.

At 908, if a sign is recognized, the one or more processors may determine the sign type of the recognized traffic sign.

At 910, the one or more processors may receive GPS information from a GPS receiver. For example, the GPS information may be used with map information to determine a geographic location of the vehicle and the geographic location of the sign that has been recognized.

At 912, the one or more processors may obtain sign information related to the recognized sign type from a data structure of stored sign information. Further, in some cases, the data structure may contain information that differs based on different geographic jurisdictions, such as for different states, different countries, and the like. Additionally, in some examples, the sign information may be made more accurate based on empirically collected data regarding actual measured sign positions that has been collected by a plurality of vehicles and aggregated to enhance or otherwise update the data structure. Accordingly, information related to the recognized sign type may be retrieved from the data structure based on the sign type of the recognized sign and geographic location information, and may include information such as the minimum distance and height of the sign from a road edge, the likely distance and height of the sign from the road edge, a range of the likely distances and heights of the sign from the road edge, and so forth.

At 914, the one or more processors may determine road edge location and height based at least partially on the sign information and position of sign relative to vehicle frame of reference. In some examples, the one or more processors may generate a 3D depth map based on the one or more images and may relate the depth map to a coordinates of the vehicle in a vehicle frame of reference. Thus, the one or more processors may determine a likely location of the road edge in the one or more images and may determine the location of the vehicle on the road in relation to the road edge based on the one or more images. In some examples, as discussed above with respect to FIG. 2, the sign information may be used to determine a likely detection area in the one or more images upon which the recognition module may focus for detecting the road edge, rather than having to attempt to detect the road edge from a much larger area of the image.

At 916, the one or more processors may determine at least one of a road plane, free area, or road center based on the road edge location. In some examples, the one or more processors may detect a right-side road edge and a left-side road edge using the techniques described herein. For example, traffic signs might be detected on both sides of the road. When both left and right road edges can be detected within a threshold level of confidence, the road plane can be predicted based on the detected road edges. As another example, if only one road edge can be detected within a threshold level of confidence, the one or more processor may use road information to determine the road plane and/or free space. For example, based on the GPS information and the map information, the one or more processors may access a road information data structure that may indicate, for the type of road, one or more of a typical width of the road in the current jurisdiction in which the vehicle is located, a likely width of a shoulder, if any, a likely lane width, a likely distance from the road edge to a centerline of the road, and so forth. As with the sign information data structure discussed above, in some examples, the road data structure may be enhanced or otherwise augmented with empirical data collected by a plurality of vehicles and aggregated to determine the road information for particular geographic jurisdictions, particular geographic locations within a jurisdiction, particular individual roads, and so forth, depending on the desired level of granularity of the road data structure.

Further, implementations herein may detect and recognize signs on the both sides of a road. For instance, the sign type of traffic signs typically may be recognized by the shape of the sign. Further, the back of a traffic sign may usually be distinguished from the front based on the presence of text or symbols, or lack thereof, the location of a pole or other support, and so forth. Thus, in some cases, the road edge on both the left side and the right side of a road may be estimated based on recognized signs on both the left side and the right side of the road. The road plane may be calculated considering the flat or typically rounded road surface likely to exist between the two road edges. Further, in some cases for determining a lateral distance from the recognized sign, the system may generate a 3D depth map from one or more images captured by one or more sensors and/or based on parallax determined between two images obtained from different perspectives, such as by using a stereo camera, multiple cameras, or multiple images taken at different points in time, e.g., as the vehicle moves at a known velocity. The one or more images may be related to a frame of reference of the vehicle to determine the location of the road edges with respect to the vehicle location.

At 918, the one or more processors may send one or more control signals to at least one vehicle component based on the determined likely location of the road edge relative to a location of the vehicle on the road. For example, based on the likely location of the road edge, and thereby the likely free space, the one or more processors may make one or more decisions, such as for controlling the vehicle, issuing a warning to an occupant, or the like. For instance, the one or more processors may send a control signal to adjust the steering of the vehicle, to apply the brakes of the vehicle, to accelerate or decelerate the engine or motor, or to perform other functions for controlling the vehicle. Additionally, or alternatively, such as in the case of an ADAS system or a semi-autonomous vehicle, the one or more processors may issue an alert to warn a driver of a detected condition, based on the road edge location or the like. Further, the one or more processors may send, to a display, and indication of the road edge, travel lane, shoulder, and so forth, so that corresponding graphics may be overlaid on one or more images of the road in real time or near-real time.

FIG. 10 is a flow diagram illustrating an example process 1000 for recognizing a traffic sign according to some implementations. In some examples, the process 1000 may be performed by one or more processors executing the recognition module.

At 1002, the one or more processors may receive one or more images from one or more sensors. For example, in the case that the sensors include one or more cameras, the images may be obtained using visible light, infrared light, or both. Further, the one or more images may be obtained additionally, or alternatively, using other sensing technologies, or combinations thereof, such as LIDAR, radar, ultrasound, and so forth.

At 1004, the one or more processors may preprocess the one or more images to reduce noise in the images. For example, in the case that the images are obtained from a camera using visible and/or infrared light, one or more filtering techniques may be used to remove noise, such as salt and pepper noise, Gaussian noise, or the like, from the images. Examples of techniques that may be used include linear smoothing filters, chroma-and-luminance noise separation, wavelet transforms, statistical methods, and nonlinear filters.

At 1006, the one or more processors may detect a sign in a received image. For example, the one or more processor may detect that one of the images includes a traffic sign, but the sign may not yet be recognizable at that point. Further, implementations herein may detect and recognize signs on the both sides of a road.

At 1008, the one or more processors may track the detected sign in subsequent received images. The one or more processors may track the sign in a sequence of images, and as the vehicle approaches closer to the sign, may perform additional recognition functions to attempt to recognize the sign type of the sign. Further, by tracking the sign in multiple images, the one or more processors may determine the location of the sign with respect to the vehicle's frame of reference, and thereby may determine the distance of the sign with respect to the vehicle. Additionally, in some cases, when the type of the sign cannot be recognized and/or regulation information or other distance information regarding a recognized traffic sign is not available to the road detection system, the one or more processors may determine that the road edge is likely to be located in an area between the vehicle and the traffic sign. Accordingly, the target search area 206 discussed above with respect to FIG. 2 may be determined based on this assumption and may encompass the area between the vehicle and the traffic sign.

At 1010, the one or more processors may recognize a sign type of the detected sign from one or more of the images. In some cases, the one or more processors may use various features of the sign for recognizing the sign type of the sign, such as by recognizing text on the sign, color, shape, size, support structures of the sign, may distinguish the front of a sign from the rear of a sign, and so forth. As one example, the recognition module 320 may be executed on the one or more processors to include, or to employ, a computational model that has been trained using training data to recognize various different sign types from different angles, different distances, different weather conditions, different light conditions, and so forth. In some cases, the computational model may be periodically updated and re-trained based on new training data to keep the computational model up to date. Examples of computational models that may be used in some implementations herein may include predictive models, decision trees, classifiers, regression models, such as linear regression models, support vector machines, and stochastic models, such as Markov models and hidden Markov models, artificial neural networks, such as recurrent neural networks, long short term memory (LSTM) neural networks, and so forth. When a sign type has been recognized, the one or more processors may then perform road edge detection, e.g., as discussed above with respect to FIG. 10.

FIG. 11 is a flow diagram illustrating an example process 1100 for updating one or more data structures according to some implementations. In some examples, the process 1100 may be performed in part by one or more processors executing the recognition module on a vehicle, and in part by one or more remote service computing devices.

At 1102, the one or more processors may determine positions of recognized sign types with respect to road edges and/or determine road information for a road on which the vehicle is traveling. For example, the one or more processors may determine, from the at least one image, a distance from the road edge to the sign, and/or empirical road information including at least one of: a distance from the road edge to a centerline of the road, a width of a travel lane of the road, a width of the road, or a width of a paved shoulder.

At 1104, the one or more processors may store the sign position information and/or road information in a log with associated geographic location information.

At 1106, the one or more processors may send the sign position information and/or road information and geographic location information to a service computing device.

At 1108, the service computing device may receive the sign position information and/or road information from a plurality of vehicles for one or more geographic jurisdictions.

At 1110, the service computing device may compare the received sign position information with sign position information obtained from a jurisdictional entity and/or compare the received road information with road information obtained from the jurisdictional entity for a particular geographic jurisdiction.

At 1112, the service computing device may add, change, or otherwise update one or more entries in a sign information data structure and/or a road information data structure based on the comparison. For example, the service computing device may change an entry in the sign information data structure from a minimum lateral distance to a range of lateral distances. As one example, suppose that the jurisdictional entity specified that warning signs are to be place a minimum of 6 feet from the edge of a paved shoulder on a rural road. Further, suppose that the empirical data detected by a plurality of vehicles shows that 90 percent of warning signs in the geographic jurisdiction are between 6 and 8 feet from the edges paved shoulders on rural roads. Accordingly, the service computing device may change the likely distance for warning signs on rural roads in the geographic jurisdiction from a minimum of 6 feet to 6-8 feet from the edge of the paved shoulder.

At 1114, the service computing device may send the updated sign information data structure and/or the updated road information data structure.

At 1116, the one or more processors at the vehicle may receive the updated sign information data structure and/or road information data structure. For example, the processors at the vehicle may receive, from the service computing device, updated sign information that has been updated based on empirical sign information sent to the service computing device from a plurality of vehicles, and may store the updated sign information for use in determining a location of a road edge in the future. Further, the processors at the vehicle may receive, from the service computing device, updated road information that has been updated based on empirical road information sent to the service computing device from a plurality of vehicles, and may store the updated road information for use in determining in the future a location of at least one of another road edge, a road centerline, a travel lane, or a shoulder size.

At 1118, the one or more processors may use the updated sign information data structure and/or the updated road information data structure when determining at least one of a road edge, a road plane, a road centerline, a travel lane, or free space.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, the implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Various instructions, processes, and techniques described herein may be considered in the general context of computer-executable instructions, such as program modules stored on computer-readable media, and executed by the processor(s) herein. Generally, program modules include routines, programs, objects, components, data structures, executable code, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A system comprising:
one or more processors; and
one or more non-transitory computer-readable media storing a database including sign information for a plurality of different sign types of traffic signs, the sign information including, for each sign type of the plurality of sign types, a predefined lateral distance from the sign type to a road edge, wherein the sign information in the database is initially generated at least using information specified by a jurisdictional entity, wherein the sign information in the database is subsequently updated using empirical data received from a plurality of vehicles over time;
the one or more non-transitory computer-readable media further including executable instructions, which, when executed by the one or more processors, configure the one or more processors to:
receive at least one image from at least one sensor;
recognize the sign type of a traffic sign in the at least one image; and
determine a likely location of the road edge in relation to a vehicle based at least partially on the recognized sign type and the predefined lateral distance specified by the sign information in the database, wherein determining the likely location of the road edge includes applying a first weight to the information specified by the jurisdictional entity in the database, and a second weight to the empirical data in the database.

2. The system as recited in claim 1, wherein the one or more processors are further configured to send one or more control signals to at least one component of the vehicle based on the determined likely location of the road edge relative to the vehicle.

3. The system as recited in claim 2, wherein the one or more control signals comprise a signal for controlling at least one of:
a steering component of the vehicle;
a braking component of the vehicle; or
a speed control component of an engine or motor driving the vehicle.

4. The system as recited in claim 1, wherein the one or more processors are further configured to determine the likely location of the road edge by:
determining, based at least partially on the recognized sign type and the sign information, a target area of the at least one image where the road edge is likely to be located in the at least one image, wherein the target area is a subset of a total image area of the at least one image;
searching the target area of the at least one image for one or more features indicative of the road edge; and
determining the likely location of the road edge based at least partially on the one or more features.

5. The system as recited in claim 4, wherein the one or more processors are further configured to:
determine the target area in a longitudinal direction corresponding to a direction of travel of the vehicle based on recognition of a first type of sign; and
determine the target area to include in the target area an area lateral to the direction of travel of the vehicle based on recognition of a second type of sign.

6. The system as recited in claim 1, wherein:
the sign information in the database relates the sign type to the distance to the road edge for a plurality of sign types for a plurality of geographic jurisdictions; and
the one or more processors are further configured to:
receive geographic location information indicating a geographic location of the vehicle;
determine, from map information and the geographic location, a geographic jurisdiction in which the vehicle is indicated to be located; and
determine the likely location of the road edge in relation to the vehicle based at least partially on the recognized sign type, the sign information in the database, and indicated geographic jurisdiction.

7. The system as recited in claim 1, wherein:
the database further includes road information indicating at least one of a distance from a road edge to a road centerline specified by the jurisdictional entity, or a size of travel lanes specified by the jurisdictional entity; and
the one or more processors are further configured to determine, based at least partially on the road information and the likely location of the road edge, at least one of:
a likely location of a centerline of a road on which the vehicle is located; or
a likely location of a travel lane of the road on which the vehicle is located.

8. The system as recited in claim 1, wherein:
the database further includes road information indicating, for a plurality of types of roads for a plurality of geographic jurisdictions, at least one of a distance from a road edge to a road centerline specified by respective jurisdictional entities of respective geographic jurisdictions, or a size of travel lanes specified by respective jurisdictional entities of respective geographic jurisdictions; and
the one or more processors are further configured to:
receive geographic location information indicating a geographic location of the vehicle;
determine, from map information and the geographic location, a geographic jurisdiction in which the vehicle is indicated to be located; and
determine, based at least partially on the road information, the geographic jurisdiction, and the likely location of the road edge, at least one of:
a likely location of a centerline of a road on which the vehicle is located; or
a likely location of a travel lane of the road on which the vehicle is located.

9. The system as recited in claim 1, wherein:
the sign information indicates, for individual sign types, the predefined lateral distance of the sign to the road edge and a predefined height of the sign from a road surface specified by the jurisdictional entity; and
the one or more processors are further configured to determine at least one of a likely road plane or a likely free space on the road based at least partially on the recognized sign type and the sign information.

10. The system as recited in claim 1, further comprising at least one of a pair of cameras or a stereo camera as the at least one sensor,
wherein the one or more processors are further configured to determine the likely location of the road edge in relation to the vehicle based at least partially on a difference between a first position of the sign in a first image and second position of the sign in a second image, wherein the first image is taken by a first camera or through a first aperture of the stereo camera and the second image is taken by a second camera or through a second aperture of the stereo camera.

11. The system as recited in claim 1, wherein the one or more processors are further configured to:
detect the road edge within a threshold level of confidence;
determine, from the at least one image, a distance from the road edge to the sign;
receive an indication of a geographic location of the vehicle; and
store, as empirical sign information, the determined distance from the road edge to the sign and the geographic location information.

12. The system as recited in claim 11, wherein the one or more processors are further configured to:
send, over a network to a service computing device, the stored empirical sign information;
receive, from the service computing device, as a portion of the empirical data, updated sign information that has been updated based on empirical sign information sent to the service computing device from the plurality of vehicles; and
store the updated sign information in the database for use in determining a location of another road edge.

13. The system as recited in claim 1, wherein the one or more processors are further configured to:
detect the road edge and one or more other road features within a threshold level of confidence;
determine, from the at least one image, empirical road information including at least one of:
a distance from the road edge to a centerline of the road,
a width of a travel lane of the road,
a width of the road, or
a width of a paved shoulder;
receive an indication of a geographic location of the vehicle; and
store the empirical road information in association with the geographic location information.

14. The system as recited in claim 13, wherein the one or more processors are further configured to:
send, over a network to a service computing device, the stored empirical road information;
receive, from the service computing device, updated road information that has been updated based on empirical road information sent to the service computing device from a plurality of vehicles; and
store the updated road information in the database for use in determining a location of at least one of another road edge, a road centerline, a travel lane, or a shoulder size.

15. The system as recited in claim 1, wherein, if the sign information in the database does not include distance information associated with a recognized sign, the one or more processors are further configured to determine the likely location of the road edge based at least partially on a searching a target area between the vehicle and the recognized sign.

16. A method for operating a vehicle comprising:
storing, by one or more processors on the vehicle, a database including sign information for a plurality of different sign types of traffic signs, the sign information including, for each sign type of the plurality of sign types, a predefined lateral distance from the sign type to a road edge, wherein the sign information in the database is initially generated at least using information specified by a jurisdictional entity, wherein the sign information in the database is subsequently updated using empirical data received from a plurality of vehicles over time;

receiving, by the one or more processors, at least one image from at least one sensor;

recognizing, by the one or more processors, the sign type of a traffic sign in the at least one image;

determining, by the one or more processors, a likely location of the road edge in relation to the vehicle based at least partially on the recognized sign type and the predefined lateral distance specified by the sign information in the database, wherein determining the likely location of the road edge includes applying a first weight to the information specified by the jurisdictional entity in the database, and a second weight to the empirical data in the database; and sending, by the one or more processors, one or more control signals to at least one component of the vehicle based on the determined likely location of the road edge relative to the vehicle.

17. The method as recited in claim 16, wherein the sign information in the database indicates, for individual sign types, the predefined lateral distance of the sign type to the road edge and a predefined height of the sign type from a road surface specified by the jurisdictional entity, and the method further comprises determining at least one of a likely road plane or a likely free space on the road based at least partially on the recognized sign type and the sign information in the database.

18. The method as recited in claim 16, wherein road information is stored on the vehicle in the database, the road information indicating at least one of a distance from a road edge to a road centerline specified by the jurisdictional entity, or a size of travel lanes specified by the jurisdictional entity, the method further comprising determining, based at least partially on the stored road information and the likely location of the road edge, at least one of:

a likely location of a centerline of a road on which the vehicle is located; or a likely location of a travel lane of the road on which the vehicle is located.

19. A non-transitory computer readable medium storing processor executable instructions which, when executed by one or more processors, configure the one or more processors to:

store, in a storage in a vehicle, a database including sign information for a plurality of different sign types of traffic signs, the sign information including, for each sign type of the plurality of sign types, a predefined lateral distance from the sign type to a road edge, wherein the sign information in the database is initially generated at least using information specified by a jurisdictional entity, wherein the sign information in the database is subsequently updated using empirical data received from a plurality of vehicles over time;

receive at least one image from at least one sensor;

recognize the sign type of a traffic sign in the at least one image; and determine a likely location of the road edge in relation to the vehicle based at least partially on the recognized sign type and the predefined lateral distance specified by the sign information in the database, wherein determining the likely location of the road edge includes applying a first weight to the information specified by the jurisdictional entity in the database, and a second weight to the empirical data in the database.

20. The non-transitory computer readable medium as recited in claim 19, wherein the sign information in the database indicates, for individual sign types, the predefined lateral distance of the sign type to the road edge and a predefined height of the sign type from a road surface specified by the jurisdictional entity, and the one or more processors are further configured to determine at least one of a likely road plane or a likely free space on the road based at least partially on the recognized sign type and the sign information in the database.

* * * * *